US010733231B2

(12) United States Patent
Burke

(10) Patent No.: US 10,733,231 B2
(45) Date of Patent: Aug. 4, 2020

(54) METHOD AND SYSTEM FOR MODELING IMAGE OF INTEREST TO USERS

(71) Applicant: Sensormatic Electronics, LLC, Boca Raton, FL (US)

(72) Inventor: Anthony Burke, Noblesville, IN (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 249 days.

(21) Appl. No.: 15/076,709

(22) Filed: Mar. 22, 2016

(65) Prior Publication Data

US 2017/0277785 A1    Sep. 28, 2017

(51) Int. Cl.
*G06F 16/783* (2019.01)
*H04N 7/18* (2006.01)
(Continued)

(52) U.S. Cl.
CPC .......... *G06F 16/7844* (2019.01); *G06F 16/23* (2019.01); *G06F 16/24578* (2019.01);
(Continued)

(58) Field of Classification Search
CPC ........ G06F 16/70; G06F 16/74; G06F 16/783; G06F 16/7837; G06F 16/784;
(Continued)

(56) References Cited

U.S. PATENT DOCUMENTS 3,217,098 A    11/1965 Oswald
4,940,925 A    7/1990 Wand et al.
(Continued)

FOREIGN PATENT DOCUMENTS

EP    2 164 003 A1    3/2010
EP    2 538 672 A1    12/2012
(Continued)

OTHER PUBLICATIONS

Lu Weilin & Gan Keng Hoon, "Personalization of Trending Tweets using Like-Dislike Category Model", 60 Procedia Comp. Sci. 236-245 (Dec. 2015) (Year: 2015).*

(Continued)

*Primary Examiner* — David N Werner
(74) *Attorney, Agent, or Firm* — HoustonHogle LLP

(57) ABSTRACT

A system and method for modeling and distributing image data of interest to users is disclosed. Users on user devices such as mobile phones send request messages for image data captured by surveillance cameras of the system. The request messages include information for selecting the image data, such as camera number and time of recording of the image data, in examples. In response, an application server of the system collects the image data from the surveillance cameras, and supplies image data to the users based on a model that the application server creates and updates for each of the users. The model ranks image data of potential interest for each of the users, where the model is based on the information for selecting the image data provided by the users. Preferably, a machine learning application of the application server creates the model for each of the users.

16 Claims, 4 Drawing Sheets

(51) Int. Cl.
  *G06K 9/00* (2006.01)
  *G06K 9/62* (2006.01)
  *G06F 16/70* (2019.01)
  *G06F 16/23* (2019.01)
  *G06F 16/2457* (2019.01)
  *G06F 16/78* (2019.01)
  *G06F 16/74* (2019.01)
  *G06F 16/735* (2019.01)
  *G08B 13/196* (2006.01)
  *G08B 13/194* (2006.01)
  *G06N 20/00* (2019.01)
  *H04N 21/475* (2011.01)

(52) U.S. Cl.
  CPC ............ *G06F 16/70* (2019.01); *G06F 16/735* (2019.01); *G06F 16/74* (2019.01); *G06F 16/78* (2019.01); *G06F 16/783* (2019.01); *G06F 16/784* (2019.01); *G06F 16/7837* (2019.01); *G06K 9/00771* (2013.01); *G06K 9/623* (2013.01); *G08B 13/194* (2013.01); *G08B 13/196* (2013.01); *H04N 7/18* (2013.01); *H04N 7/181* (2013.01); *G06N 20/00* (2019.01); *H04N 21/4758* (2013.01)

(58) Field of Classification Search
  CPC ............... G06F 16/7844; G06F 16/735; H04N 21/4758; H04N 7/18; G06K 9/00771; G08B 13/194; G08B 13/196
  See application file for complete search history.

(56) References Cited

U.S. PATENT DOCUMENTS

| | | | |
|---|---|---|---|
| 5,164,827 A | 11/1992 | Paff | |
| 5,204,536 A | 4/1993 | Vardi | |
| 5,317,394 A | 5/1994 | Hale et al. | |
| 5,729,471 A | 3/1998 | Jain et al. | |
| 5,850,352 A | 12/1998 | Moezzi et al. | |
| 5,940,538 A | 8/1999 | Spiegel et al. | |
| 5,951,695 A | 9/1999 | Kolovson | |
| 5,969,755 A | 10/1999 | Courtney | |
| 6,341,183 B1 | 1/2002 | Goldberg | |
| 6,359,647 B1 | 3/2002 | Sengupta et al. | |
| 6,581,000 B2 | 6/2003 | Hills et al. | |
| 6,643,795 B1 | 11/2003 | Sicola et al. | |
| 6,724,421 B1 | 4/2004 | Glatt | |
| 6,812,835 B2 | 11/2004 | Ito et al. | |
| 6,970,083 B2 | 11/2005 | Venetianer et al. | |
| 7,091,949 B2 | 8/2006 | Hansen | |
| 7,242,423 B2 | 7/2007 | Lin | |
| 7,286,157 B2 | 10/2007 | Buehler | |
| 7,342,489 B1 | 3/2008 | Milinusic et al. | |
| 7,382,244 B1 | 6/2008 | Donovan et al. | |
| 7,409,076 B2 | 8/2008 | Brown et al. | |
| 7,428,002 B2 | 9/2008 | Monroe | |
| 7,450,735 B1 | 11/2008 | Shah et al. | |
| 7,456,596 B2 | 11/2008 | Goodall et al. | |
| 7,460,149 B1 | 12/2008 | Donovan et al. | |
| 7,529,388 B2 | 5/2009 | Brown et al. | |
| 7,623,152 B1 | 11/2009 | Kaplinsky | |
| 7,623,676 B2 | 11/2009 | Zhao et al. | |
| 7,733,375 B2 | 6/2010 | Mahowald | |
| 7,996,718 B1 | 8/2011 | Ou et al. | |
| 8,249,301 B2 | 8/2012 | Brown et al. | |
| 8,300,102 B2 | 10/2012 | Nam et al. | |
| 8,325,979 B2 | 12/2012 | Taborowski et al. | |
| 8,482,609 B1 | 7/2013 | Mishra et al. | |
| 8,483,490 B2 | 7/2013 | Brown et al. | |
| 8,502,868 B2 | 8/2013 | Buehler et al. | |
| 8,528,019 B1* | 9/2013 | Dimitrova ............. H04H 60/46 725/46 | |
| 8,558,907 B2 | 10/2013 | Goh et al. | |
| 8,594,482 B2 | 11/2013 | Fan et al. | |
| 8,675,074 B2 | 3/2014 | Salgar et al. | |
| 8,723,952 B1 | 5/2014 | Rozenboim | |
| 8,849,764 B1 | 9/2014 | Long et al. | |
| 8,995,712 B2 | 3/2015 | Huang et al. | |
| 9,015,167 B1 | 4/2015 | Ballou et al. | |
| 9,058,520 B2 | 6/2015 | Xie et al. | |
| 9,094,615 B2 | 7/2015 | Aman et al. | |
| 9,129,179 B1 | 9/2015 | Wong | |
| 9,158,975 B2 | 10/2015 | Lipton et al. | |
| 9,168,882 B1 | 10/2015 | Mirza et al. | |
| 9,197,861 B2 | 11/2015 | Saptharishi et al. | |
| 9,280,833 B2 | 3/2016 | Brown et al. | |
| 9,412,269 B2 | 8/2016 | Saptharishi et al. | |
| 9,495,614 B1 | 11/2016 | Boman et al. | |
| 9,594,963 B2 | 3/2017 | Bobbitt et al. | |
| 9,641,763 B2 | 5/2017 | Bernal et al. | |
| 9,674,458 B2 | 6/2017 | Teich et al. | |
| 9,785,898 B2 | 10/2017 | Hofman et al. | |
| 9,860,554 B2 | 1/2018 | Samuelsson et al. | |
| 9,967,446 B2 | 5/2018 | Park | |
| 2002/0104098 A1 | 8/2002 | Zustak et al. | |
| 2003/0093580 A1* | 5/2003 | Thomas ................. H04N 7/163 719/318 | |
| 2003/0093794 A1* | 5/2003 | Thomas .............. G06F 16/7844 725/46 | |
| 2003/0101104 A1* | 5/2003 | Dimitrova .......... G06Q 30/0641 705/27.1 | |
| 2003/0107592 A1* | 6/2003 | Li ....................... G06F 16/7844 715/745 | |
| 2003/0107649 A1 | 6/2003 | Flickner et al. | |
| 2003/0163816 A1* | 8/2003 | Gutta ..................... H04N 7/163 725/46 | |
| 2003/0169337 A1 | 9/2003 | Wilson et al. | |
| 2004/0025180 A1* | 2/2004 | Begeja ............... H04N 7/17318 725/46 | |
| 2005/0012817 A1 | 1/2005 | Hampapur et al. | |
| 2005/0057653 A1 | 3/2005 | Maruya | |
| 2006/0001742 A1 | 1/2006 | Park | |
| 2006/0165379 A1* | 7/2006 | Agnihotri ............... G11B 27/28 386/231 | |
| 2006/0173856 A1 | 8/2006 | Jackson et al. | |
| 2006/0181612 A1 | 8/2006 | Lee et al. | |
| 2006/0239645 A1 | 10/2006 | Curtner et al. | |
| 2006/0243798 A1 | 11/2006 | Kundu et al. | |
| 2007/0178823 A1 | 8/2007 | Aronstam et al. | |
| 2007/0182818 A1 | 8/2007 | Buehler | |
| 2007/0245379 A1* | 10/2007 | Agnihortri ............. H04N 7/163 725/46 | |
| 2007/0279494 A1 | 12/2007 | Aman et al. | |
| 2007/0294207 A1 | 12/2007 | Brown et al. | |
| 2008/0004036 A1 | 1/2008 | Bhuta et al. | |
| 2008/0101789 A1 | 5/2008 | Sharma | |
| 2008/0114477 A1 | 5/2008 | Wu | |
| 2008/0158336 A1 | 7/2008 | Benson et al. | |
| 2008/0180537 A1 | 7/2008 | Weinberg et al. | |
| 2009/0006368 A1* | 1/2009 | Mei ..................... H04N 7/17318 | |
| 2009/0237508 A1 | 9/2009 | Arpa et al. | |
| 2009/0268033 A1 | 10/2009 | Ukita | |
| 2009/0273663 A1 | 11/2009 | Yoshida | |
| 2009/0284601 A1 | 11/2009 | Eledath et al. | |
| 2010/0013917 A1 | 1/2010 | Hanna et al. | |
| 2010/0038417 A1 | 2/2010 | Blankitny | |
| 2010/0110212 A1 | 5/2010 | Kuwahara et al. | |
| 2010/0153182 A1 | 6/2010 | Quinn et al. | |
| 2010/0232288 A1 | 9/2010 | Coatney et al. | |
| 2011/0043631 A1 | 2/2011 | Marman et al. | |
| 2011/0128384 A1 | 6/2011 | Tiscareno et al. | |
| 2011/0246626 A1 | 10/2011 | Peterson et al. | |
| 2011/0289119 A1 | 11/2011 | Hu et al. | |
| 2011/0289417 A1 | 11/2011 | Schaefer et al. | |
| 2011/0320861 A1 | 12/2011 | Bayer et al. | |
| 2012/0017057 A1* | 1/2012 | Higuchi ................. G06F 3/0614 711/162 | |
| 2012/0072420 A1 | 3/2012 | Moganti et al. | |
| 2012/0098969 A1 | 4/2012 | Wengrovitz et al. | |
| 2012/0206605 A1* | 8/2012 | Buehler ........... G08B 13/19645 348/159 | |
| 2012/0226526 A1 | 9/2012 | Donovan et al. | |

(56) References Cited

U.S. PATENT DOCUMENTS

| | | |
|---|---|---|
| 2013/0106977 A1 | 5/2013 | Chu et al. |
| 2013/0115879 A1 | 5/2013 | Wilson et al. |
| 2013/0166711 A1 | 6/2013 | Wang et al. |
| 2013/0169801 A1 | 7/2013 | Martin et al. |
| 2013/0223625 A1 | 8/2013 | de Waal et al. |
| 2013/0278780 A1 | 10/2013 | Cazier et al. |
| 2013/0343731 A1 | 12/2013 | Pashkevich et al. |
| 2014/0085480 A1 | 3/2014 | Saptharishi |
| 2014/0172627 A1 | 6/2014 | Levy et al. |
| 2014/0211018 A1 | 7/2014 | de Lima et al. |
| 2014/0218520 A1 | 8/2014 | Teich et al. |
| 2014/0282991 A1 | 9/2014 | Watanabe et al. |
| 2014/0330729 A1 | 11/2014 | Colangelo |
| 2014/0362223 A1 | 12/2014 | LaCroix et al. |
| 2014/0375982 A1 | 12/2014 | Jovicic et al. |
| 2015/0039458 A1 | 2/2015 | Reid |
| 2015/0092052 A1 | 4/2015 | Shin et al. |
| 2015/0121470 A1 | 4/2015 | Rongo et al. |
| 2015/0208040 A1 | 7/2015 | Chen et al. |
| 2015/0215583 A1 | 7/2015 | Chang |
| 2015/0244992 A1 | 8/2015 | Buehler |
| 2015/0249496 A1 | 9/2015 | Muijs et al. |
| 2015/0294119 A1 | 10/2015 | Gundam et al. |
| 2015/0358576 A1 | 12/2015 | Hirose et al. |
| 2015/0379729 A1 | 12/2015 | Datta et al. |
| 2015/0381946 A1 | 12/2015 | Renkis |
| 2016/0014381 A1 | 1/2016 | Rolf et al. |
| 2016/0065615 A1 | 3/2016 | Scanzano et al. |
| 2016/0224430 A1 | 8/2016 | Long et al. |
| 2016/0225121 A1 | 8/2016 | Gupta et al. |
| 2016/0269631 A1 | 9/2016 | Jiang et al. |
| 2016/0357648 A1 | 12/2016 | Keremane et al. |
| 2016/0379074 A1 | 12/2016 | Nielsen et al. |
| 2017/0193673 A1 | 7/2017 | Heidemann et al. |
| 2017/0278365 A1 | 9/2017 | Madar et al. |
| 2017/0278367 A1 | 9/2017 | Burke et al. |
| 2017/0278368 A1 | 9/2017 | Burke |
| 2017/0280043 A1 | 9/2017 | Burke et al. |
| 2017/0280102 A1 | 9/2017 | Burke |
| 2017/0280103 A1 | 9/2017 | Burke et al. |
| 2018/0076892 A1 | 3/2018 | Brilman et al. |

FOREIGN PATENT DOCUMENTS

| | | |
|---|---|---|
| JP | 2003151048 A | 5/2003 |
| JP | 2010074382 A | 4/2010 |
| WO | 2007/030168 A1 | 3/2007 |
| WO | 2013/141742 A1 | 9/2013 |
| WO | 2014/114754 A1 | 7/2014 |

OTHER PUBLICATIONS

International Search Report and the Written Opinion of the International Searching Authority, dated May 31, 2017, from International Application No. PCT/US2017/023430, filed Mar. 21, 2017. Fourteen pages.

International Search Report and the Written Opinion of the International Searching Authority, dated Jun. 12, 2017, from International Application No. PCT/US2017/023440, filed on Mar. 21, 2017. Fourteen pages.

International Search Report and the Written Opinion of the International Searching Authority, dated Jun. 19, 2017, from International Application No. PCT/US2017/023436, filed on Mar. 21, 2017. Fourteen pages.

International Search Report and the Written Opinion of the International Searching Authority, dated Jun. 21, 2017, from International Application No. PCT/US2017/023444, filed on Mar. 21, 2017. Thirteen pages.

International Search Report and the Written Opinion of the International Searching Authority, dated Jun. 28, 2017, from International Application No. PCT/US2017/023434, filed on Mar. 21, 2017. Thirteen pages.

International Preliminary Report on Patentability, dated Oct. 4, 2018, from International Application No. PCT/US2017/023440, filed on Mar. 21, 2017. Eight pages.

International Preliminary Report on Patentability, dated Oct. 4, 2018, from International Application No. PCT/US2017/023434, filed on Mar. 21, 2017. Eight pages.

International Preliminary Report on Patentability, dated Oct. 4, 2018, from International Application No. PCT/US2017/023430, filed Mar. 21, 2017. Eight pages.

International Preliminary Report on Patentability, dated Oct. 4, 2018, from International Application No. PCT/US2017/023436, filed on Mar. 21, 2017. Eight pages.

International Preliminary Report on Patentability, dated Oct. 4, 2018, from International Application No. PCT/US2017/023444, filed on Mar. 21, 2017. Seven pages.

* cited by examiner

METHOD AND SYSTEM FOR MODELING IMAGE OF INTEREST TO USERS

RELATED APPLICATIONS

This application is related to:

U.S. application Ser. No. 15/076,701 filed on Mar. 22, 2016, entitled "Method and system for surveillance camera arbitration of uplink consumption," now U.S. Patent Publication No.: 2017/0278368 A1;

U.S. application Ser. No. 15/076,703 filed on Mar. 22, 2016, entitled "Method and system for pooled local storage by surveillance cameras," U.S. Patent Publication No.: 2017/0280102 A1;

U.S. application Ser. No. 15/076,704 filed on Mar. 22, 2016, entitled "System and method for designating surveillance camera regions of interest," now U.S. Patent Publication No.: 2017/0277967 A1:

U.S. application Ser. No. 15/076,705 filed on Mar. 22, 2016, entitled "System and method for deadzone detection in surveillance camera network," now U.S. Patent Publication No.: 2017/0278366 A1;

U.S. application Ser. No. 15/076,706 filed on Mar. 22, 2016, entitled "System and method for overlap detection in surveillance camera network," now U.S. Patent Publication No.: 2017/0278367 A1;

U.S. application Ser. No. 15/076,708 filed on Mar. 22, 2016, entitled "System and method for retail customer tracking in surveillance camera network," now U.S. Patent Publication No.: 2017/0278137 A1;

U.S. application Ser. No. 15/076,710 filed on Mar. 22, 2016, entitled "System and method for using mobile device of zone and correlated motion detection," now U.S. Patent Publication No.: 2017/0280103 A1:

U.S. application Ser. No. 15/076,712 filed on Mar. 22, 2016, entitled "Method and system for conveying data from monitored scene via surveillance cameras," now U.S. Patent Publication No.: 2017/0277947 A1;

U.S. application Ser. No. 15/076,713 filed on Mar. 22, 2016, entitled "System and method for configuring surveillance cameras using mobile computing devices," now U.S. Patent Publication No.: 2017/0278365 A1;

and

U.S. application Ser. No. 15/076,717 filed on Mar. 22, 2016, entitled "System and method for controlling surveillance cameras," now U.S. Patent Publication No.: 2017/0280043 A1.

All of the afore-mentioned applications are incorporated herein by this reference in their entirety.

BACKGROUND OF THE INVENTION

Traditionally, surveillance camera systems were often proprietary/closed-standards systems. Surveillance cameras of the systems captured image data of scenes within or around a premises, and the image data was compiled into a matrix view for real time viewing at possibly a security guard station or back office video monitor. The video storage system for storing the image data was typically a video cassette recorder (VCR located in a network room or back office within the premises being monitored.

More recently, the surveillance camera systems have begun using open standards, which has enabled users to more easily access the image data of the surveillance cameras. The surveillance cameras and other components of the systems typically communicate over a data network, such as a local area network. On user devices such as laptops, computer workstations and mobile phones, users can access and select image data from specific surveillance cameras for real-time viewing upon and downloading to the user devices. In addition, the users on the user devices can also access previously recorded image data stored on devices such as network video recorders on the network.

The surveillance camera systems can also include video analytics systems that analyze image data from the surveillance cameras. Often, the analytics systems will track moving objects against fixed background models. More sophisticated functions include object detection to determine the presence of an object or a type of the object. The analytics systems generate video primitives or meta data for the detected objects and determined events, which the analytics systems can further process or send over the data networks to other systems for storage and incorporation into the image data as metadata, for example.

SUMMARY OF THE INVENTION

It would be beneficial to anticipate image data of potential interest for users based information from the user or by learning based, for example, on their requests for image data. For this purpose, a surveillance camera system might receive requests for image data from users on user devices. The requests include information for selecting the image data, such as the camera number and time of day that the image data were recorded, in examples. An application server of the system receives the requests, and utilizes a machine learning application to build models for each of the users based on the information for selecting the image data in the requests.

These models could be used a number of ways. The models could rank image data of potential interest for each of the users. An application server of the system applies the model for each user to the image data, and model-suggested image data for each user is created in response. The system then sends the requested image data along with the model-suggested image data to the users. In this way, subsequent selection of image data by the users, including selection of image data of the model-suggested image data sent to the users, can be used to update the model for each of the users.

It would also be beneficial to anticipate image data of potential interest for users based on information derived from the image data selected by the users. For this purpose, the system includes an analytics system that generates video primitives from the image data. The application server can then update the models for each of the users based on the video primitives, in one example.

When the users receive the model-suggested image data set at the user devices, yet another benefit that can be achieved is for the users to directly "vote" which of the image data in the model-suggested image data are important (or not). For this purpose, the application server might additionally supplies voting buttons associated with the model-suggested image data to the users on the user devices. Separate sets of voting buttons are associated with each specific frame and/or stream of image data within the model-suggested image data.

In response to the user selecting the voting buttons (e.g. "thumbs up" or "thumbs down") associated with specific image data of the model-suggested image data, the voting buttons generate associated voting information. This voting information for the image data, along with information that identifies the image data, is included in request messages that the users send to the application server and are examples of information for selecting image data provided by the users. This provides a feedback mechanism to the machine learning capability of the application server, which can update the model for each of the users in response to the voting information provided by the users for selected image data at the user devices.

The system also maintains video history data for each of users. The video history data can include prior requests for image data and video primitives generated by the analytics system for the previously requested image data. The system can then update the models for each of the users based on the video history data.

In general, according to one aspect, the invention features a method for distributing image data to users. The method comprises collecting image data from surveillance cameras and supplying the image data to user devices of the users, based on models for each of the users that rank image data of potential interest for each of the users.

In examples, the models are created for each of the users based on information for selecting the image data provided by the users. The information for selecting the image data provided by each of the users might include a surveillance camera number from which the image data was generated, a camera angle, a zoom setting, a time of recording, and/or voting information and/or data from other sensors.

The models for each of the users can be updated based on voting information provided by the users and/or based on video history data maintained for each of the users. The history data could include image data selected for or provided by the users, and video primitives generated from image data selected by the users.

Supplying the image data to user devices of the users might comprise creating or tagging model-suggested image data for each of the users by applying the models for each of the users to the image data, and sending the model-suggested image data to the users. A display graphic could be built for presentation on the user devices that includes the model-suggested image data for each of the users and then sent.

User are able to rank the image data supplied to each of the users by using voting buttons in association with the image data supplied to each of the users, in one case.

In general, according to another aspect, the invention features a method for ranking image data for distribution to users. This method comprises collecting image data from surveillance cameras and analyzing image data accessed by the users at user devices and building a model that ranks image data of potential interest for each of the users.

In general, according to still another aspect, the invention features a user based image data distribution system. The system comprises an application server that collects image data from one or more surveillance cameras and supplies image data to user devices of the users, based on models for each of the users that rank image data of potential interest for each of the users. The image data supplied to the user devices of the users preferably includes model-suggested image data which is based on a ranking of the image data of potential interest for each of the users.

The application server can additionally supply voting buttons associated with the model-suggested image data supplied to the user devices of the users, where selection of the voting buttons associated with the model-suggested image data enables the users to rank the image data supplied to each of the users. Then, in response to selection of the voting buttons associated with the model-suggested image data, the user devices of the users generate voting information for image data of the model-suggested image data and include the voting information in messages sent to the application server to rank the image data supplied to each of the users.

Applications running on the user devices of the users preferably receive the model-suggested image data and associated voting buttons supplied by the application server. The applications also send request messages to the application server, where the request messages include the information for selecting the image data provided by each of the users.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms including the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
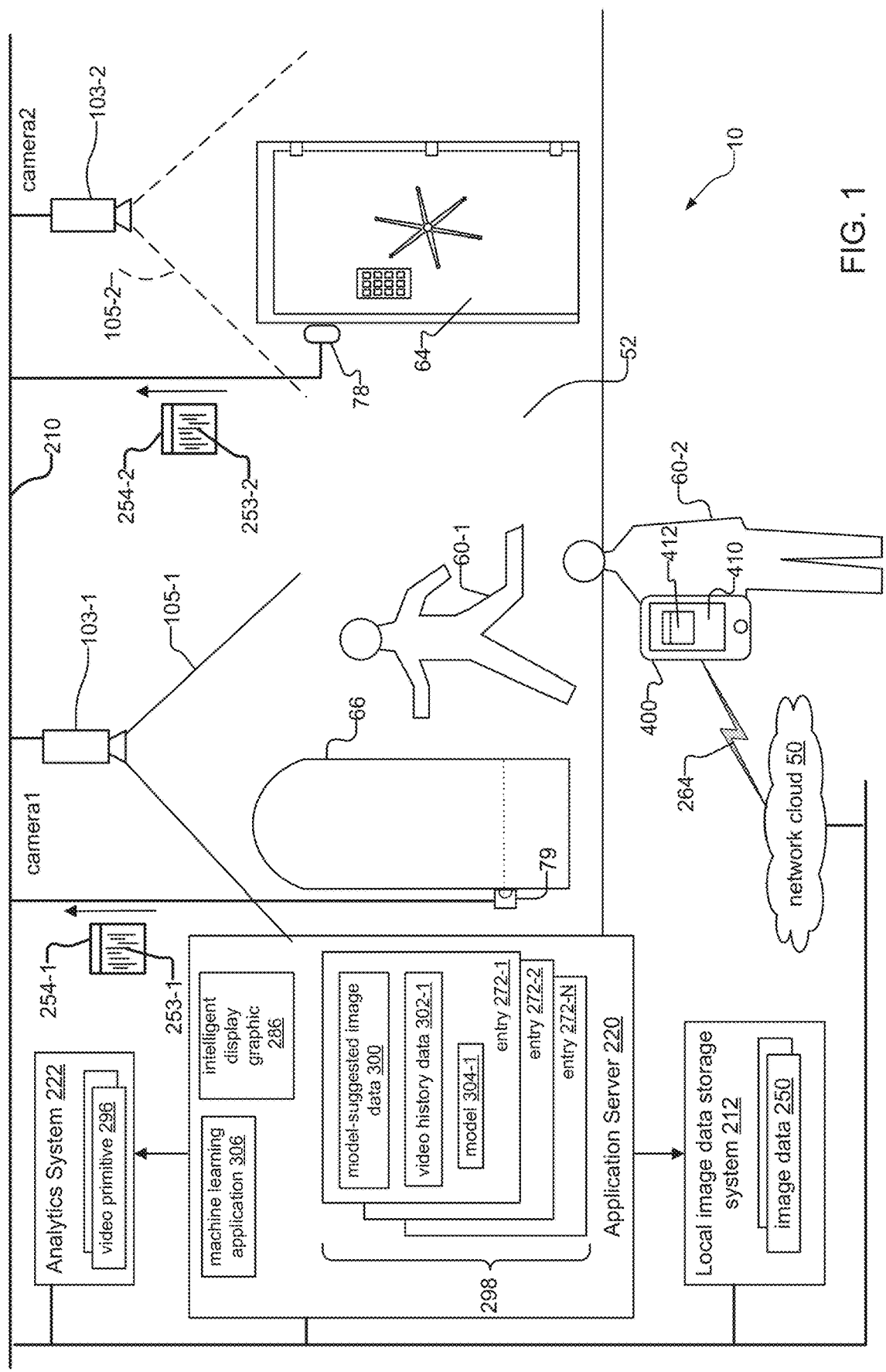
FIG. 1 is a schematic diagram of an image data distribution system for an exemplary premises including one or more surveillance cameras, where the system collects image data from the one or more surveillance cameras, and supplies image data for each of the users based on models that rank image data of potential interest for each of the users.

FIG. 1 shows an exemplary image data distribution system 10 to which the present invention is directed. The system 10 includes surveillance cameras 103, sensor devices such as motion sensor 79 and contact switch sensor 78 that communicate over a local network 210. The system 10 also includes an analytics system 222, application server 220, and a local image data storage system 212, in this illustrated example.

A user 60-2 holds a user device 400 for communicating with the application server 220. Each user device 400 includes a display screen 410 and one or more applications 412, or "apps." The apps 412 display information to the user 60-2 via the display screen 410 of the user device 400. The apps 412 execute upon the operating systems of the user devices 400. The apps 412 communicate with the application server 220 over a network cloud 50 via a wireless connection 264. Examples of user devices 400 include smartphones, tablet computing devices, and laptop computers running operating systems such as Windows, Android, Linux, or IOS, in examples.

In the illustrated example, surveillance cameras 103 such as camera1 103-1 and camera2 103-2 are installed within a premises 52. Field of view 105-1 of camera1 103-1 captures individuals 60-1 as they enter or exit through a doorway 66 of the premises. Field of view 105-2 of camera2 103-2 captures activity near a safe 64. Image data 250 of the scene captured by the surveillance cameras 103 are stored either locally within the cameras 103 or sent by the cameras 103 over the network 210 for storage within the local image data storage system 212. In one example, the local image data storage system 212 is a network video recorder (NVR).

Motion sensor 79 detects motion of individuals 60-1 through doorway 66. In response to detecting motion, sensor 79 sends sensor message 254-1 including sensor data 253-1 for the motion detection events over the network 210 to the application server 220. In a similar vein, contact switch sensor 78 detects opening of a door of safe 64, and includes sensor data 253-2 associated with safe door opening events in sensor messages 254-2 over the network 210 to the application server 220.

The analytics system 222 receives requests from the application server 220 to analyze image data 250. In response, the analytics system 222 generates video primitives 296 that describe objects and/or events of interest determined from analyzing the image data 250. In examples, the video primitives may be a text description of some or all of the objects and observable features within a set of image data 250. These video primitives 296 also may include descriptions of the objects, their locations, velocities, shape, colors, location of body parts, etc.

The application server 220 includes a machine learning application 306 and creates entries 272 for each of the users in a user database 298. Each entry 272 includes a model 304, video history data 302, and a suggested image data list 300. The application server 220 also builds an intelligent display graphic 286 for presentation on the user devices 400 of the users 60-2. In one implementation, the entries 272 can additionally include sensor data 253.

In one implementation, the analytics system 222 and/or the application server is/are integrated within one or more of the surveillance cameras 103. Moreover, the image data 250 can additionally be stored locally within the surveillance cameras 103.

Figure 2:
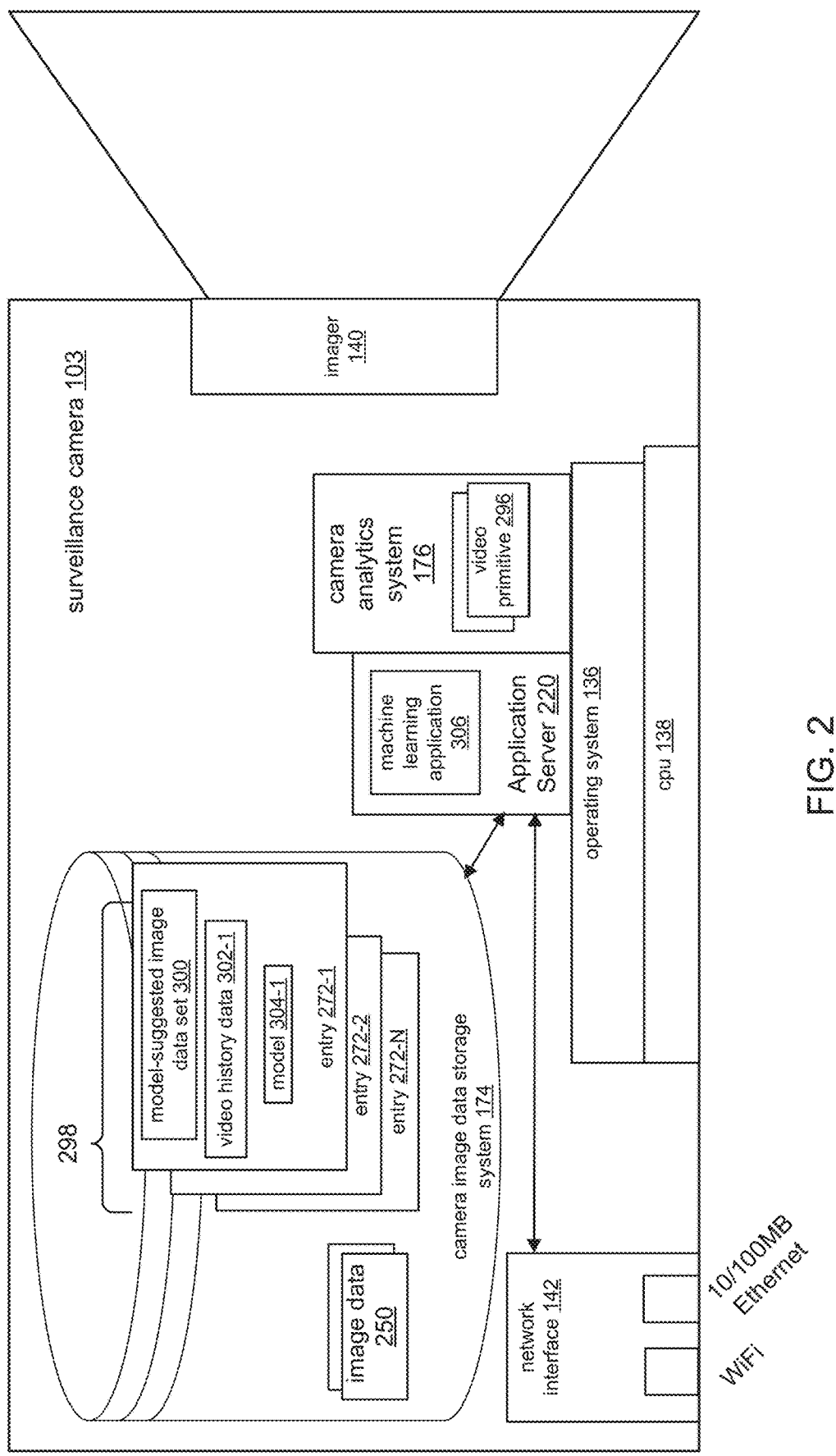
FIG. 2 is a schematic diagram of an embodiment of a surveillance camera that supports image data distribution to users in accordance with principles of the present invention.

FIG. 2 shows some of the components of an exemplary surveillance camera 103. In the example, the surveillance camera 103 stores its image data 250 locally and includes an integrated application server 220 and analytics system (here, a camera analytics system 176) as discussed herein above, for one embodiment.

The camera 103 includes a processing unit (CPU) 138, an imager 140, a camera image data storage system 174 and a network interface 142. An operating system 136 runs on top of the CPU 138. A number of processes or applications are executed by the operating system 136. The processes include an application server 220 and a camera analytics system 176.

The camera 103 saves image data 250 captured by the imager 140 to the camera image data storage system 174. Each camera 103 can support one or more streams of image data 250. The application server 220 receives and sends messages 264 via its network interface 142. The application server 220 also stores the user database 298 within the camera image data storage system 174.

The control process 162 sends the image data 250 to the integrated camera analytics system 176 for analysis in some cases. The camera analytics system 176 analyzes the image data 250 and generates video primitives 296 in response to the analysis. The video primitives can also be stored to the camera image data storage system 174.

In some cases, the cameras 103 may also or alternatively stream image data to the user device 400 or the external analytics system 312 and these analytics systems analyze the image data 250.

Figure 3:
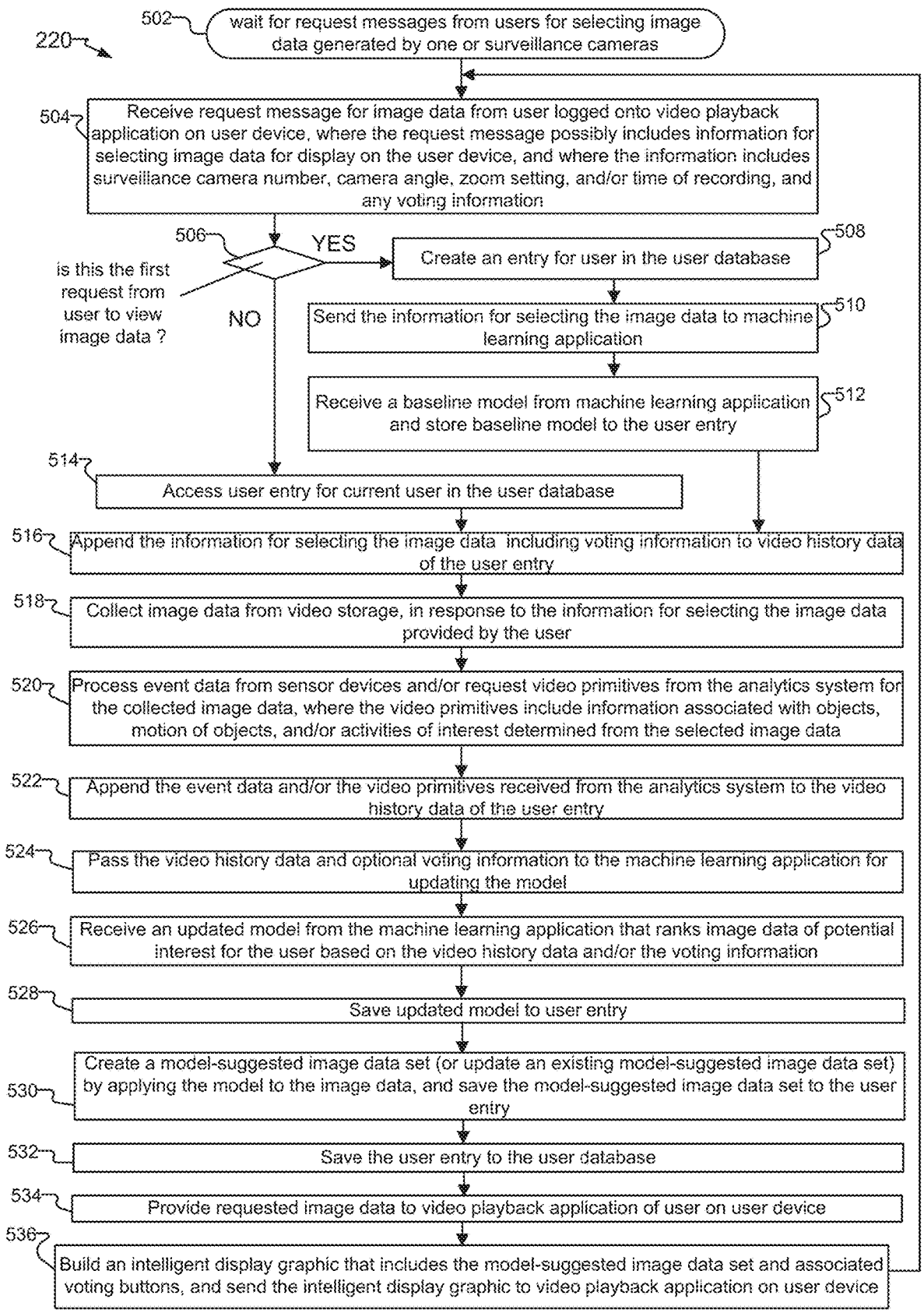
FIG. 3 is a flow diagram showing a method for employing models for ranking image data and supplying the image data to each of the users.

FIG. 3 shows a preferred method of the camera-integrated or separate application server 220 for distributing image data 250 to users 60-2 on user devices 400. Via a video playback application 412 on the user device 400, a user 60-2 requests image data 250 from one or more of the surveillance cameras 103. In response, the application server 220 employs models 304 for ranking the requested image data 250 and supplies the image data 250 to each of the users 60-2.

In step 502, the application server 220 waits for request messages from users 60-2 for selecting image data 250 generated by one or surveillance cameras 103. According to step 504, the application server 220 receives a request message for image data 250 from a user 60-2 logged onto a video playback application 412 on a user device 400, where the request message possibly includes information for selecting image data 250 for display on the user device 400, and where the information includes surveillance camera number, camera angle, zoom setting, and/or time of recording, and/or any voting information, in examples.

In step 506, the application server 220 determines if this the first request from the user 60-2 to view image data 250. If this is the first request from the user 60-2, an entry for the user 60-2 is created in the user database 298 in step 508. Otherwise, the method transitions to step 514 to access the user entry 272 for the current user 60-2 in the user database 298.

Upon conclusion of step 508, in step 510, the application server 220 sends the information for selecting the image data 250 to the machine learning application 306. Then, in step 512, the application server 220 receives a baseline model 304 from the machine learning application 306 and stores the baseline model 304 to the user entry 272 for the user 60-2 in the user database 298. The model 306 for each of the users 60-2 ranks image data 250 of potential interest for each of the users 60-2. Preferably, the machine learning application 306 creates the model 306 for each of the users or classes of users based on information for selecting the image data 250 provided by the users 60-2.

Upon conclusion of both steps 514 and 512, the entry 272 for the user 60-2 that issued the request for image data 250 is further processed in step 516. According to step 516, the application server 220 appends the information for selecting the image data including voting information to video history data 302 of the entry 272 for the user 60-2.

In step 518, the application server 220 collects image data 250 from video storage, in response to the information for selecting the image data provided by the user 60-2. In embodiments, the video storage is the local image data storage system 212 that communicates over the local network 210 or the camera image data storage system 174 of the individual surveillance cameras 103. According to step 520, the application server 220 processes event data from sensor devices 78,79 and/or requests video primitives 296 from the analytics system 222 for the collected image data 250, where the video primitives 296 include information associated with objects, motion of objects, and/or activities of interest determined from the selected image data 250, in examples.

According to step 522, the application server 220 appends the event data and/or the video primitives 296 received from the analytics system 222 to video history data 302 of the user entry 272 for the current user 60-2. In step 524, the application server 220 passes the video history data 250 and optional voting information provided by the users 60-2 to the machine learning application 306 for updating the model 304. In this way, the application server 220, via its machine learning application 306, can update the models for each of the users based on voting information provided by the users and/or based on the video history data 302 maintained for each of the users 60-2. In one implementation, the video history data 302 can also include video primitives 296 generated from image data 250 selected by the users.

In step 526, the application server 220 receives an updated model 304 from the machine learning application 306 that ranks image data 250 of potential interest for the user 60-2 based on the video history data 302 and/or the voting information. The application server 220 saves the updated model 304 to the entry 272 for the user 60-2 in step 528.

In step 530, the application server 220 creates model-suggested image data 300 (or updates existing model-suggested image data) by applying the model 304 to the image data 250, and saves the model-suggested image data 300 to the user entry 272 for the user. In step 532, the application server 220 saves the user entry 272 to the user database 298.

According to step 534, the application server 220 then provides the requested image data 250 to the video playback application 412 of the user 60-2 on user device 400. Then, in step 536, the application server 220 builds an intelligent display graphic 286 that includes the model-suggested image data 300 and associated voting buttons 420/422, and sends the intelligent display graphic 286 to the video playback application 412 on the user device 400.

Upon conclusion of step 536, the method transitions back to the beginning of step 504 to receive additional request messages from users, where the request messages include the information for selecting image data provided by the users.

Figure 4:
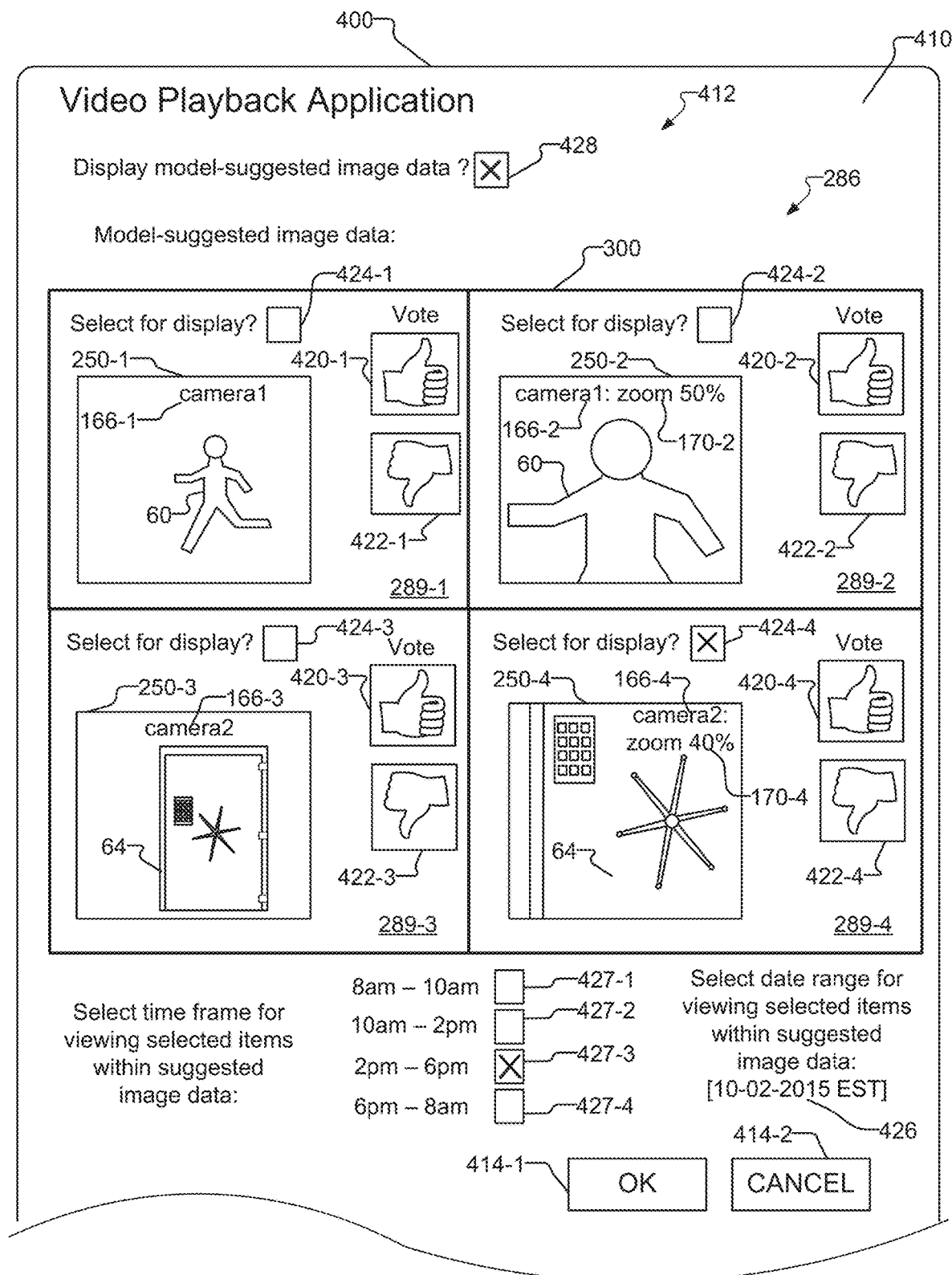
FIG. 4 is a schematic diagram of a video playback application running on a user device that includes model-suggested image data supplied to the users by the system, where the system creates the model-suggested image data according to the method of FIG. 3 by applying the model for the user to image data from the surveillance cameras.

FIG. 4 shows a video playback application 412 running on a user device 400.

The video playback application 412 enables a user 60-2 to select image data 250 for display on the user device 400 via request messages sent from the video playback application 412 to the application server 220. The request messages include information provided by the user 60-2 for selecting the image data 250. In response to the selection, the application server 220 returns the requested image data 250, and builds models 306 for the user 60-2 based on the information provided by the user 60-2 for selecting the image data 250 in the request messages.

Then, the video playback application 412 also receives model-suggested image data 300. The application server 220 creates the model-suggested image data 300 for each of the users by applying the models 304 for each of the users 60-2 to the image data 250, and then sends the model-suggested image data 300 to the users 60-2.

The video playback application 412 provides a model-suggested image data selector 428. Via the model-suggested image data selector 428, the user 60-2 can control whether the model-suggested image data 300 provided by the application server 220 is displayed by the video playback application 412. Because the model-suggested image data selector 428 is currently selected by the user, the intelligent display graphic 286 built by the application server 220 is displayed on the display screen 410 of the user device 400. The intelligent display graphic 286 was built in accordance with the method of FIG. 3.

The intelligent display graphic 286, in turn, includes image data 250 of the model-suggested image data 300 arranged in panes 289 of a grid. In the specific example illustrated in FIG. 4, the model-suggested image data 300 includes four exemplary frames of image data 250-1 through 250-4 and are included within respective panes 289-1 through 289-4. In one implementation, the intelligent display graphic 286 includes thumbnails to represent the frames of image data 250 within the model-suggested image data 300.

The intelligent display graphic 286 also includes time frame selectors 427 and buttons 414. The time frame selectors 427 enable the user 60-2 to select time frames for viewing items within the model-suggested image data 300. In the example, separate time frame selectors 427-1 through 427-4 enable selection of different pre-selected time ranges within a 24 hour period for a given date selection 426, where the date selection is in [mm-dd-yyyy <timezone>] format, in one example. The date selection 426 can additionally support a date range. In the example, the user 60-2 has selected a time range of between 2 pm and 6 pm via selector 427-3. In response, the video playback application 412 will include the time frame selection 427-3 and date selection 426 in the information for selecting the image data 250 (here, the model-suggested image data 300) included within the request message sent to the application server 220.

Also included within panes 289-1 through 289-4 are image data selectors 424 and voting buttons 420/424. Separate sets of the image data selectors 424 and the voting buttons 420/424 are associated with the image data 250-1 through 250-4 and are described with respect to the contents provided within each pane 289 of the grid of the intelligent display graphic 286.

Pane 289-1 of the display graphic 286 includes image data 250-1, a "thumbs up" voting button 420-1, a "thumbs down" voting button 422-1, and image data selector 424-1 that prompts the user to select image data 250-1 for display. The image data 250-1 presents a scene that includes individual 60 that was captured from surveillance camera 103-1, indicated by camera number 166-1 "camera1." Selection of either the "thumbs up" voting button 420-1 or "thumbs down" voting button 422-1 causes associated voting information for the image data 250-1 to be included in the request message sent to the application server 220. The application server 220 can then adjust the model 304 for the user 60-2 based on the information in the request message (e.g. the voting information associated with the image data 250-1).

Pane 289-2 of the display graphic 286 includes image data 250-2, a "thumbs up" voting button 420-2, a "thumbs down" voting button 422-2, and image data selector 424-2 that prompts the user to select image data 250-2 for display. The image data 250-2 presents a scene including an individual 60 with zoom setting of 50%, indicated by reference 170-2. The image data 250-2 was captured from surveillance camera 103-1, indicated by camera number 166-2 "camera1." Selection of either the "thumbs up" voting button 420-2 or "thumbs down" voting button 422-2 causes associated voting information for the image data 250-2 to be included in the request message sent to the application server 220.

In a similar vein, pane 289-3 of the display graphic 286 includes image data 250-3, a "thumbs up" voting button 420-3, a "thumbs down" voting button 422-3, and image data selector 424-3 that prompts the user to select image data 250-3 for display. The image data 250-3 presents a scene that includes safe 64. The image data 250-3 was captured from surveillance camera 103-2, indicated by camera number 166-3 "camera2." Selection of either the "thumbs up" voting button 420-3 or "thumbs down" voting button 422-3 causes associated voting information for the image data 250-3 to be included in the request message sent to the application server 220.

Finally, pane 289-4 of the display graphic 286 includes image data 250-4, a "thumbs up" voting button 420-4, a "thumbs down" voting button 422-4, and image data selector 424-4 that prompts the user to select image data 250-4 for display. The image data 250-4 presents a scene that includes safe 64 with a zoom setting of 40%, indicated by reference 170-4. The image data 250-3 was captured from surveillance camera 103-2, indicated by camera number 166-4 "camera2." Selection of either the "thumbs up" voting button 420-4 or "thumbs down" voting button 422-4 causes associated voting information for the image data 250-4 to be included in the request message sent to the application server 220.

The user 60-2 can then select the "OK" button 414-1 or the "CANCEL" button 414-2. In response to selection of the "OK" button 414-1, the selections made by the user 60-2 are included in a new request message sent to the application server 220. This is also indicated by step 536 in FIG. 3. In this way, the selections made by users 60-2 upon the image data 250 of the model-suggested image data 300 also update the model 304-1 for the user 60-2.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for distributing image data to users, the method comprising:
    maintaining a database of models, each of the models corresponding to different users;
    in response to requests from users for video image data, creating models for the users if no models exist for the users;
    collecting image data from surveillance cameras;
    supplying the image data to user devices of the users, based on the models for each of the users in the database, the models ranking image data of potential interest for each of the users; and
    analyzing image data accessed by the users at user devices and updating the models for the users based on the accessed image data by the users, the models ranking image data of potential interest for each of the users and also updating the models for each of the users based on voting information provided by the users which is collected when each of the users selects voting buttons of display graphics displayed in association with the image data supplied to each of the users on display screens of the user devices and updating the models for each of the users based on video history data maintained for each of the users, wherein the video history data includes information for selecting image data provided by the users, and video primitives generated from image data selected by the users, wherein the video primitives comprise a text description of some or all of the objects and observable features within the image data.

2. The method of claim 1, further comprising creating the models for each of the users based on information for selecting the image data provided by the users.

3. The method of claim 2, wherein the information for selecting the image data provided by each of the users includes a surveillance camera number from which the image data was generated, a camera angle, a zoom setting, a time of recording, and voting information.

4. The method of claim 1, wherein supplying the image data to user devices of the users comprises creating a model-suggested image data set for each of the users by applying the models for each of the users to the image data, and sending the model-suggested image data set to the users.

5. The method of claim 1, wherein supplying the image data to user devices of the users comprises:
    creating a model-suggested image data set for each of the users by applying the models for each of the users to the image data;
    building a display graphic for presentation on the user devices that includes the model-suggested image data set for each of the users; and
    sending the display graphic to the user devices of the users, which display the graphic, wherein the graphics include time frame selectors that enable the users to select time frames for viewing items within the model-suggested image data.

6. The method of claim 1, further comprising different image data selectors associated with the different image data displayed on the display screens of the user devices for selecting the corresponding image data for display.

7. The method of claim 1, further comprising displaying model-suggested image data selectors enabling the users to control whether model-suggested image data is displayed on the display screens.

8. The method of claim 1, further comprising displaying time of day selectors for enabling the users to control time frames for the image data that is displayed on the display screens.

9. A user based image data distribution system, the system comprising:
    user devices operated by users for displaying image data;
    an application server that collects image data from one or more surveillance cameras and maintains a database of models, each of the models corresponding to different users, wherein in response to requests from users for video image data, the application server creates models for the users if no models exist for the users, and supplies image data to the user devices of the users, based on the models for each of the users, the models for ranking image data of potential interest for each of the users; and an analytics system that generates video primitives for image data selected by the users, wherein the video primitives comprise a text description of some or all of the objects and observable features within the image data, and the application server updates the models for each of the users based on the video primitives, and wherein the application server additionally supplies voting buttons associated with the model-suggested image data supplied to the user devices of the users, and wherein selection of the voting buttons associated with the model-suggested image data displayed on display screens enables the users to rank the image data supplied to each of the users; and wherein in response to selection of the voting buttons, the user devices of the users generate voting information for image data of the model-suggested image data and include the voting information in messages sent to the application server to rank the image data supplied to each of the users wherein the models for each of the users are based on information for selecting the image data provided by the users, the information for selecting the image data provided by each of the users including a surveillance camera number from which the image data was generated, a camera angle, a zoom setting, a time of recording, and voting information.

10. The system of claim 9, wherein the application server includes a machine learning application that creates the models for each of the users.

11. The system of claim 9, wherein the image data supplied to the user devices of the users includes model-suggested image data for ranking the image data of potential interest for each of the users.

12. The system of claim 9, wherein the models for each of the users are based on information for selecting the image data provided by the users.

13. The system of claim 12, wherein the information for selecting the image data provided by each of the users includes a surveillance camera number from which the image data was generated, a camera angle, a zoom setting, a time of recording, and voting information.

14. The system of claim 12, wherein the information for selecting the image data provided by each of the users is included within request messages sent from applications running on the user devices of the users.

15. The system of claim 9, wherein the application server builds a display graphic that includes the image data for each of the users, and sends the display graphic for presentation on the user devices of the users in order to supply the image data to the user devices of the users.

16. A method for distributing image data to users, the method comprising:

maintaining a database of models, each of the models corresponding to different users;

in response to requests from users for video image data, creating models for the users if no models exist for the users;

collecting image data from surveillance cameras;

supplying the image data to user devices of the users, based on the models for each of the users in the database, the models ranking image data of potential interest for each of the users;

analyzing image data accessed by the users at user devices and updating the models for the users based on the accessed image data by the users, the models ranking image data of potential interest for each of the users and also updating the models for each of the users based on voting information provided by the users which is collected when each of the users selects voting buttons of display graphics displayed in association with the image data supplied to each of the users on display screens of the user devices and updating the models for each of the users based on video history data maintained for each of the users, wherein the video history data includes information for selecting image data provided by the users, and video primitives generated from image data selected by the users, wherein the video primitives comprise a text description of some or all of the objects and observable features within the image data; and displaying on the user devices intelligent display graphics that include time frame selectors that enable the users to select time frames for viewing items within the model-suggested image data with separate time frame selectors to enable selection of different pre-selected time ranges within a 24 hour period for a given date selection.

* * * * *